US012413610B1

(12) United States Patent
Wallis et al.

(10) Patent No.: US 12,413,610 B1
(45) Date of Patent: Sep. 9, 2025

(54) ASSESSING SECURITY OF SERVICE PROVIDER COMPUTING SYSTEMS

(71) Applicant: Wells Fargo Bank, N.A., San Francisco, CA (US)

(72) Inventors: Shawn Wallis, Fremont, CA (US); David Lorenzi, Phoenix, AZ (US); Matthew Michael Rogers, Charlotte, NC (US); Christopher Heschong, Greensboro, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 546 days.

(21) Appl. No.: 17/455,634

(22) Filed: Nov. 18, 2021

(51) Int. Cl.
*H04L 9/40* (2022.01)
*G06F 40/30* (2020.01)

(52) U.S. Cl.
CPC .......... *H04L 63/1433* (2013.01); *G06F 40/30* (2020.01)

(58) Field of Classification Search
None
See application file for complete search history.

(56) References Cited

U.S. PATENT DOCUMENTS

| | | |
|---|---|---|
| 8,966,250 B2 | 2/2015 | Shochet et al. |
| 9,015,845 B2 | 4/2015 | Schmidt et al. |
| 9,584,538 B1 | 2/2017 | Bennett et al. |
| 9,973,525 B1 * | 5/2018 | Roturier ............... H04L 63/1433 |
| 2016/0212111 A1 * | 7/2016 | Yang ...................... H04L 63/08 |
| 2021/0064492 A1 * | 3/2021 | Myers ..................... G06F 11/34 |

OTHER PUBLICATIONS

"How do perform SaaS security testing?" SaaS Security Testing, Retrieved from:: https://thecyphere.com/services/saas-security-testing/, Accessed on Jul. 12, 2021, 4 pp.
"SaaS Security Posture Management", Saasment, Retrieved from https://saasment.com/sspm, Accessed on Jul. 12, 2021, 3 pp.
Krishnaveni et al., "Automated Vulnerability Detection and Prediction by Security Testing for Cloud SAAS", Indian Journal of Science and Technology, vol. 9, No. 1, Dec. 2016, pp. 1-8.

* cited by examiner

*Primary Examiner* — Kevin S Mai
(74) *Attorney, Agent, or Firm* — Shumaker & Sieffert, P.A.

(57) ABSTRACT

This disclosure describes techniques that include assessing whether various service providers, such as cloud service providers or SaaS providers, are properly maintaining sensitive data (e.g., private, confidential, and/or non-public information) that is entrusted to them. In one example, this disclosure describes a method that includes collecting, by a computing system, information about interactions with a service provider computing system; identifying, based on the information about the interactions, a plurality of network paths, each associated with a data object accessed at the service provider computing system; requesting, based on the plurality of network paths, data from the service provider computing system; receiving a response; determining, based on the response, whether the response includes sensitive information; and taking action based on whether the response includes sensitive data.

20 Claims, 4 Drawing Sheets

ASSESSING SECURITY OF SERVICE PROVIDER COMPUTING SYSTEMS

TECHNICAL FIELD

This disclosure relates to computer networks, and more specifically, to evaluating data management practices of service providers.

BACKGROUND

Cloud computing is the delivery of computing services over a network, often the internet. Service providers offering services through the cloud are sometimes referred to as software as a service ("SaaS") providers. Such SaaS providers tend to offer services to its customers ("clients") in a way that provides convenience, fast innovation, flexible resources, and economies of scale. While there are many types of cloud services available on the internet, typically such services involve operating on, analyzing, and/or storing client data on computing systems that are outside the client's own private network, and on computing systems that the client does not own or fully control.

SUMMARY

This disclosure describes techniques that include assessing whether service providers, such as cloud computing-based service providers or SaaS providers, are properly maintaining sensitive data (e.g., private, confidential, and/or non-public information) that is entrusted to them by clients. Clients of SaaS providers may transmit sensitive data to SaaS providers for the purpose of enabling the SaaS provider to provide a specific service (e.g., storage, encryption, analysis). Sensitive data can take many forms, but often such data is private, confidential, and/or otherwise non-public data, at least from the perspective of the client.

In some examples, techniques described herein include assembling a list of network paths or data locations associated with (or potentially associated with) data maintained by a SaaS provider in a cloud computing system. The list of paths may be created, in an automated way, based on available network information. Once the list is created, each network path or data location on the list is assessed to determine whether data can be accessed from that location without authentication or any special access rights. If data can be accessed, the data is evaluated to determine whether it includes sensitive data. If the data does include sensitive data or indicia of sensitive data, a computing system may take action in response. Such actions may involve communications and alerts sent to various stakeholders, which may include the organization affected by the open disclosure of sensitive data, clients of the service provider, and/or the service provider. Other actions may involve restricting or limiting interactions with the service provider, or restricting or limiting storage of data at computing systems managed by the storage provider.

The techniques described herein may provide certain technical advantages. For instance, in some examples, a computing system may be able to generate a list of network paths or URLs that correspond to locations at which a given SaaS provider stores data. In such an example, the computing system may generate the list of network paths in an automated way based on network information available on the client's own network, and in so doing, gain insights and potentially determines a pattern for how data is typically stored at various cloud service providers. Such processes may be performed with little or no manual curation or reverse engineering of the storage practices or the structure of the network paths for various SaaS providers. Further, by systematically accessing data at service providers, a comprehensive and ongoing evaluation of data practices employed by a large number of service providers may be obtained, which enables actions to be taken where appropriate, and on a timely basis. Since early notice may be taken of SaaS providers that fail to employ appropriate or sufficient data management practices, effective remediation actions can be taken. As a result, client data entrusted to SaaS providers is more likely to be kept private, secure, and confidential.

In some examples, this disclosure describes operations performed by a computing system or collection of computing systems in accordance with one or more aspects of this disclosure. In one specific example, this disclosure describes a method comprising collecting, by a computing system, information about interactions with a service provider computing system, wherein the interactions with the service provider computing system are based on activity of user devices on a private network; identifying, by the computing system and based on the information about the interactions, a plurality of network paths, each associated with a data object accessed at the service provider computing system; requesting, based on the plurality of network paths, data from the service provider computing system; responsive to requesting the data, receiving, by the computing system, a response; determining, by the computing system and based on the response, whether the response includes sensitive information; and taking action by the computing system and based on whether the response includes sensitive data.

In another example, this disclosure describes a system comprising an analysis computing system and a collection computing system, wherein the analysis computing system is on a private network, and the collection computing system is not on the private network, and wherein the analysis computing system is configured to carry out operations described herein. In yet another example, this disclosure describes a computer-readable storage medium comprising instructions that, when executed, configure processing circuitry of a computing system to carry out operations described herein.

DETAILED DESCRIPTION

Described herein are techniques that include testing whether "Software as a Service" (SaaS) websites are missing security controls, and in particular, are exposing sensitive data to public disclosure. Sensitive data or information may include any information that can be characterized as private, confidential, and/or otherwise non-public. Businesses and other organizations routinely use services provided by third-party SaaS providers, and in the process, provide sensitive information or documents to such SaaS websites, expecting that the SaaS provider will maintain the confidentiality of the information. However, such SaaS providers might nevertheless fail to protect sensitive information and documents, and in some cases, may inadvertently make such data openly available on the internet. Techniques described herein seek to identify instances in which a SaaS provider is failing to adequately protect confidential information entrusted to it by the provider's customers.

For large organizations, monitoring practices of the SaaS providers used by members or employees of the organization can be a difficult task. Some large organizations may use, partner with, do business with, and/or otherwise interact with thousands of SaaS vendors. Typically, the identity of such vendors than an organization depends on continually evolves, with new SaaS vendors being added frequently. For many organizations, oversight of its SaaS partners is insufficient.

Figure 1:
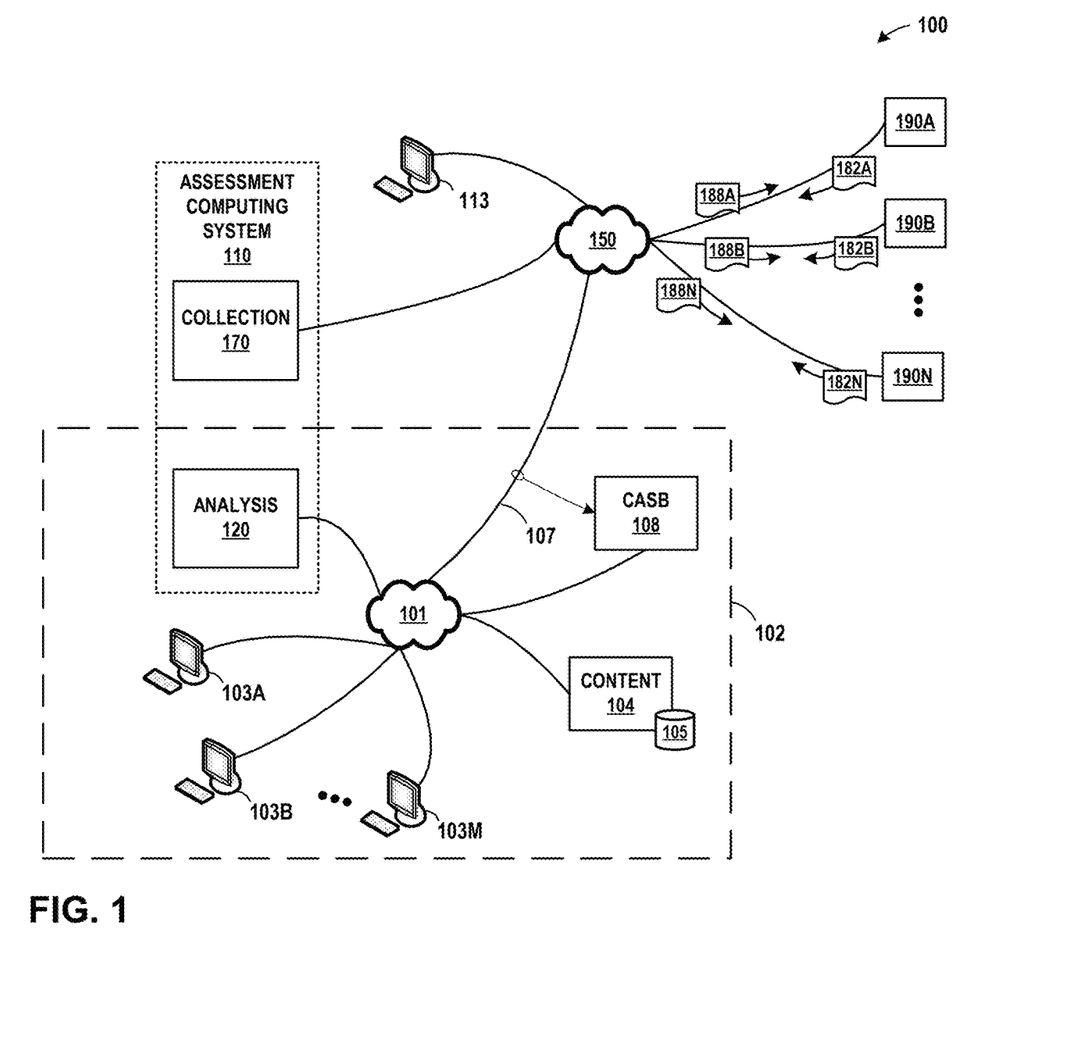
FIG. 1 is a conceptual diagram illustrating an example system in which the data maintenance and/or management practices of various service provider systems are evaluated, in accordance with one or more aspects of the present disclosure.

FIG. 1 is a conceptual diagram illustrating an example system in which the data maintenance practices of various service provider systems are evaluated, in accordance with one or more aspects of the present disclosure. In FIG. 1, system 100 includes two networks: private network 101 and public network 150. Devices connected to private network 101 may be part of a secure network not normally accessible to the public, such as an enterprise network, organizational network, or local area network. In some examples, devices and/or computing systems on private network 101 may be considered to be on enterprise network 102, which may be controlled and/or operated by a business enterprise or other organization. Although private network 101 and/or enterprise network 102 may be principally located within one location, private network 101 and/or enterprise network 102 may also be geographically distributed across multiple locations.

A number of devices and/or systems are shown connected to private network 101 and part of enterprise network 102 in FIG. 1. Such devices and systems include user devices 103A, 103B, through 103M (collectively, "user devices 103"), one or more content systems 104, and one or more cloud access security broker systems 108. Each of user devices 103 each may be any suitable computing device capable of being operated by a user (not shown). Such user devices 103 may include mobile devices, tablets, laptop computers, desktop computers, workstations, or any other suitable computing device. Typically, each of user devices 103 is capable of accessing other computing systems within private network 101 and outside of private network 101 (e.g., through public network 150). For instance, one or more of user devices 103 may interact with, over public network 150, one or more of service provider systems 190A, 190B, through 190N (collectively "service provider systems 190," and representing any number of service provider systems).

One or more content systems 104 may be used to store content pertaining to an organization or business that might use or control enterprise network 102. Such content may include records, network logs, session logs, or other information. Content systems 104 may store other information as well. One or more content systems 104 may also be or include application servers and other systems that support operations and perform processing work on behalf of one or more of user devices 103.

One or more cloud access security broker systems 108 may monitor or regulate communications between private network 101 and public network 150. In such an example, one or more cloud access security broker systems 108 may serve as an intermediary or proxy between user devices 103 and public network 150 and systems available over public network 150 (e.g., service provider systems 190). One or more of cloud access security broker systems 108 may enable private network 101 and enterprise network 102 to implement policies that apply to interactions by user devices 103 with other devices on public network 150. In so doing, one or more of cloud access security broker systems 108 may play a role in securing private network 101 and/or enterprise network 102 by addressing gaps in security when user devices 103 interact with devices (e.g., service provider systems 190) outside of private network 101. In some examples, one or more of user devices 103 may send requests to cloud access security broker system 108, which evaluates the requests, and then carries out operations on public network 150 as appropriate or consistent with policies implemented at cloud access security broker system 108 and/or within enterprise network 102. One or more cloud access security broker systems 108 may log information about sessions between various user devices 103 and service provider systems 190. Such information may include session data, proxy log data, and other information.

For ease of illustration, one cloud access security broker system 108 and one content system 104 are illustrated as included within private network 101 and enterprise network 102. In other examples, any number of cloud access security broker systems 108 and any number of content systems 104 may be included within private network 101 and/or enterprise network 102. Further, one or more of cloud access security broker systems 108 and content systems 104 may themselves deployed within a public or private cloud setting or through a service provider. In such examples, one or more cloud access security broker systems 108 and/or content systems 104 might not be logically or physically within enterprise network 102.

Private network 101 may include various other network devices, as is typical of a network. Although not shown, such devices may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems).

Public network 150 may be primarily described as a public network, such as the internet. However, techniques in accordance with one or more aspects of the present disclosure may apply to similar systems in which network 150 is implemented as a private network. As with private network 101, public network 150 may include other network devices not specifically illustrated in FIG. 1, such as one or more network hubs, network switches, network routers, satellite dishes, or any other network equipment.

Public network 150 may be used by user devices 103 within enterprise network 102 to access computing systems operated by various SaaS providers. Such computing systems are illustrated in FIG. 1 as service provider systems 190. Each of service provider systems 190 may be used to implement or provide a different service, and each may be operated by a different entity. Accordingly, each of service provider systems 190 may employ different practices to manage data entrusted to each respective service provider system 190 by clients or customers.

Clients or customers as described herein may be an organization or business, such as the organization or business that uses or controls enterprise network 102. Users within an organization or business (e.g., users operating user devices 103) may access one or more of service provider systems 190 over public network 150. Such access may be regulated to some extent by one or more cloud access security broker systems 108 or by proxy servers within enterprise networks 102. Consumers or individuals (e.g., operating consumer device 113) may also be clients or customers of one or more of service provider systems 190.

Typically, the nature of the service provided by a given SaaS provider, as implemented by a given service provider system 190, tends to involve clients and organizations providing or sending data to the service provider system 190. In some cases, the data provided to the service provider system 190 includes sensitive information, and is provided to the service provider system 190 by clients having an expectation that the sensitive information will be appropriately protected and/or kept confidential. In general, therefore, each of service provider systems 190 is likely to be entrusted with a significant amount of sensitive data from its clients or customers, where such clients or customers regard such data as private, confidential, and otherwise non-public. At least some of the techniques described herein are intended to evaluate the extent to which each of service provider systems 190 succeeds in appropriately protecting and/or maintaining its clients' and customers' sensitive data.

Assessment computing system 110 is illustrated in FIG. 1 as including both analysis computing system 120 and collection computing system 170. Analysis computing system 120, as described herein, may perform operations that include analysis of communications between user devices 103 and service provider systems 190, and interacting with collection computing system 170 to evaluate data maintenance practices and other practices of one or more service provider systems 190. Collection computing system 170, also as described herein, may perform operations that include interacting with one or more of service provider systems 190 in an attempt to access data stored at service provider systems 190, and then assessing whether such data includes information that might be characterized as private, sensitive, confidential, and/or otherwise non-public. As described herein, collection computing system 170 may report its findings to analysis computing system 120, and analysis computing system 120 may act on the findings as appropriate.

In some examples, it may be appropriate for certain operations performed by assessment computing system 110 to be carried out within enterprise network 102, whereas other operations performed by assessment computing system 110 may be more appropriately performed outside of enterprise network 102, such as on a computing device having no special access rights to any of service provider systems 190. Accordingly, assessment computing system 110 may be implemented through a distributed system that includes multiple computing systems, such as analysis computing system 120 (logically or physically located within enterprise network 102) and collection computing system 170 (logically or physically located outside of enterprise network 102). Other implementations are possible, however, and in some examples, operations described herein as being performed by analysis computing system 120 may be performed by a system outside of enterprise network 102. Likewise, in some examples, operations described herein as being performed by collection computing system 170 may be performed by a system inside of enterprise network 102.

For ease of illustration, one enterprise network 102 is shown in FIG. 1, which may correspond to a single organization or business. However, techniques described herein may be applicable and employed by many organizations and enterprise networks 102. In addition, techniques described herein may be provided as a service to multiple organizations, consumers, or other entities.

In FIG. 1, and in accordance with one or more aspects of the present disclosure, assessment computing system 110 may identify one or more of service provider systems 190. For instance, in an example that can be described in the context of FIG. 1, analysis computing system 120 of assessment computing system 110 outputs a signal over private network 101. Cloud access security broker system 108 and/or content system 104 detect a signal and determine that the signal corresponds to a request for information about interactions between user devices 103 and service provider systems 190. Cloud access security broker system 108 and/or content system 104 output a responsive signal over private network 101. Analysis computing system 120 detects a signal over private network 101 and determines that the signal includes a list of SaaS providers (each operating one of service provider systems 190) along with information about interactions between user devices 103 and service provider systems 190.

Assessment computing system 110 may filter the SaaS providers to limit the scope of analysis to be undertaken. For instance, still referring to FIG. 1, analysis computing system 120 uses the information about interactions to identify those SaaS providers where a minimum or threshold amount of traffic has been exchanged between user devices 103 and that SaaS provider's corresponding service provider system 190. Analysis computing system 120 may also use the information about interactions to identify unique network path information. Such network path information may take the form of a uniform resource locator (URL) or uniform resource identifier (URI). Analysis computing system 120 may also, based on certain attributes of the interactions between user devices 103 and service provider systems 190, identify network paths that are may be more likely to correspond locations at which a SaaS provider may store files, objects, documents, or other data that may include sensitive information. In doing so, analysis computing system 120 may analyze stem and object information included within URLs, such as in the manner described in connection with FIG. 3. Analysis computing system 120 generates a list of identified URLs based on its analysis of the information about interactions.

Assessment computing system 110 may attempt to retrieve data at the identified URLs. For instance, again referring to FIG. 1, analysis computing system 120 outputs a signal over private network 101 and public network 150. Collection computing system 170 detects a signal over public network 150 and determines that the signal includes the list of identified URLs. Collection computing system 170 uses the list of identified URLs to systematically attempt to access data at one or more of service provider systems 190. Collection computing systems 170 outputs a series of requests 188 (e.g., requests 188A through 188N) and in response, receives a series of responses 182.

In the example being described, collection computing system 170 may issue requests for data with the access rights of an anonymous computing device that merely has access to public network 150. In other words, when seeking to access data at one or more of service provider systems 190, collection computing system 170 might not provide any authentication credentials to any of service provider systems 190. Collection computing system 170 may, in some examples, simulate how a hacker or a malicious user might seek to obtain sensitive data.

Assessment computing system 110 may analyze responses 182 for sensitive data. For instance, collection computing systems 170 applies a machine learning model to any data included within responses 182. In some examples, such a machine learning model has been trained to identify sensitive information from data, such as data that might be included within responses 182. Collection computing system 170 identifies instances where one or more of service provider systems 190 have responded to a request sent by collection computing system 170 by including sensitive data.

Analysis computing system 120 may act on the evaluations performed by collection computing system 170. For instance, in FIG. 1, collection computing system 170 reports information about its evaluation to analysis computing system 120 (e.g., over public network 150 and private network 101). Analysis computing system 120 takes action based on the reporting information received from collection computing system 170. In some examples, analysis computing system 120 may interact with cloud access security broker system 108 to modify or implement policies enforced by cloud access security broker system 108 within private network 101 and enterprise network 102. In some examples, such policies may prevent further instances of sensitive data (i.e., private, confidential, or otherwise non-public information) being made available publicly on one or more of service provider systems 190.

The techniques described herein may provide certain technical advantages. Analyses performed by assessment computing system 110 may provide insights into how data is stored at various service provider systems 190. Such analyses may be performed, in some cases, with little or no manual assembly of URLs or reverse engineering of network paths to be evaluated by collection computing system 170 of assessment computing system 110. Further, by systematically accessing data at service provider systems 190, a proactive, comprehensive, and ongoing evaluation of a large number of service provider systems 190 is possible. Such an evaluation may enable early action to be taken to address or prevent data from being stored at service provider systems 190 that might not have in place proper controls for maintaining the private or confidential data. As a result, assessment computing system 110 may enable or increase the odds that client data (e.g., data generated by or used by one or more user devices 103) will be kept private, secure, and confidential.

Figure 2:
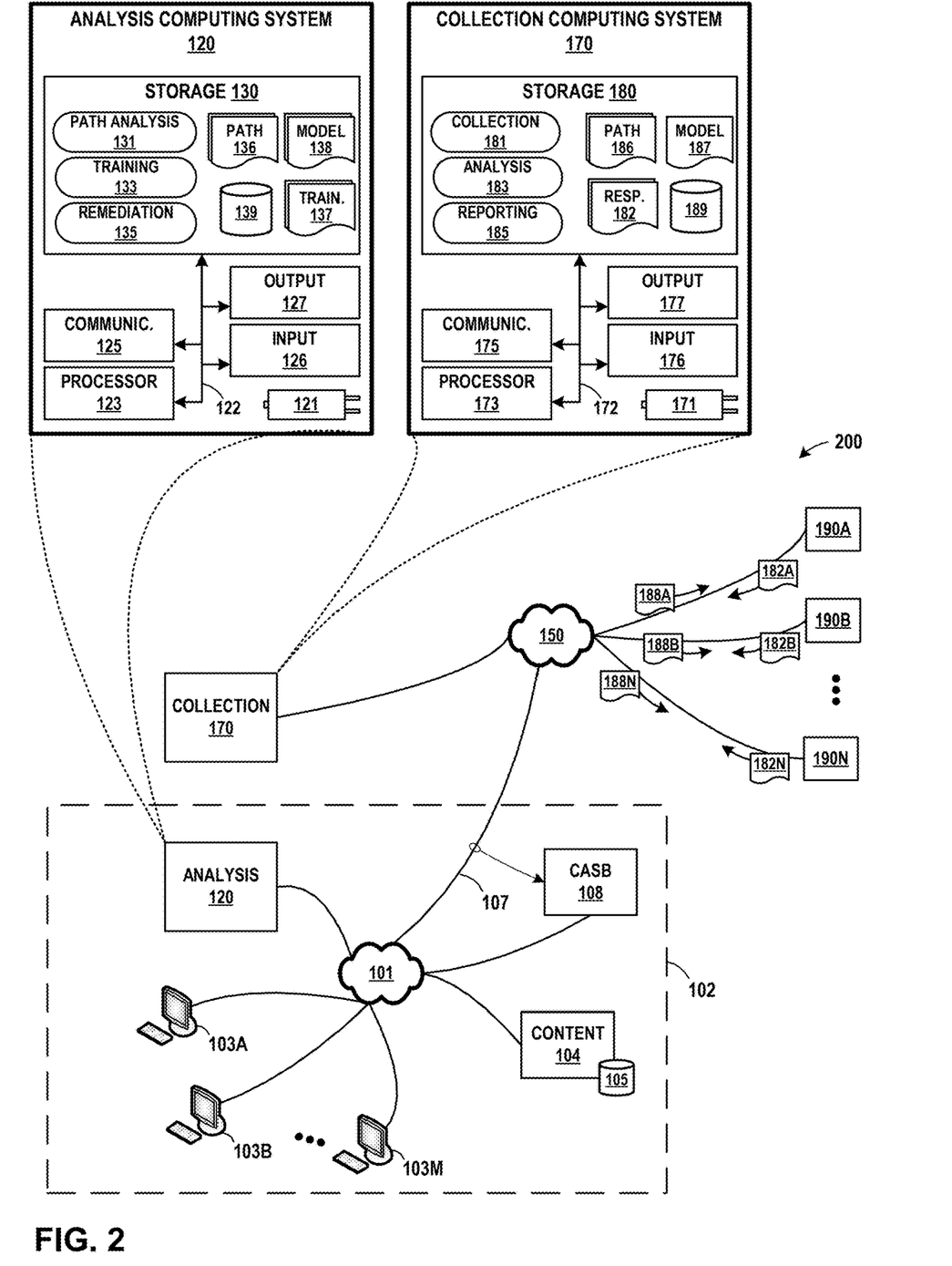
FIG. 2 is a block diagram illustrating an example system in which the data maintenance and/or management practices of various service provider systems are evaluated, in accordance with one or more aspects of the present disclosure.

FIG. 2 is a block diagram illustrating an example system in which the data maintenance practices of various service provider systems are evaluated, in accordance with one or more aspects of the present disclosure. FIG. 2 illustrates system 200, which may be similar to system 100 of FIG. 1, and may be considered an example or alternative implementation of aspects of system 100 of FIG. 1. In the example of FIG. 2, system 200 includes many of the same elements described in FIG. 1, and elements illustrated in FIG. 2 may correspond to earlier-illustrated elements that are identified by like-numbered reference numerals. For example, private network 101 and public network 150 of FIG. 2 may correspond to private network 101 and public network 150 of FIG. 1, respectively. Similarly, analysis computing system 120 and collection computing system 170 may correspond to those same components of assessment computing system 110 of FIG. 1. In general, these like-numbered elements and others may represent previously-described elements in a manner consistent with prior descriptions provided in connection with the description of FIG. 1.

In FIG. 2, analysis computing system 120 is illustrated as including underlying physical compute hardware that includes power source 121, one or more processors 123, one or more communication units 125, one or more input devices 126, one or more output devices 127, and one or more storage devices 130. Storage devices 130 may include path analysis module 131, training module 133, remediation module 135, and data store 139. Stored within storage device 130 may also be path data 136, training data 137, and one or more models 138. One or more of the devices, modules, storage areas, or other components of analysis computing system 120 may be interconnected to enable inter-component communications (physically, communicatively, and/or operatively). In some examples, such connectivity may be provided by through communication channels, which may include a system bus (e.g., communication channel 122), a network connection, an inter-process communication data structure, or any other method for communicating data.

Power source 121 of analysis computing system 120 may provide power to one or more components of analysis computing system 120. One or more processors 123 of analysis computing system 120 may implement functionality and/or execute instructions associated with analysis computing system 120 or associated with one or more modules illustrated herein and/or described below. One or more processors 123 may be, may be part of, and/or may include processing circuitry that performs operations in accordance with one or more aspects of the present disclosure. One or more communication units 125 of analysis computing system 120 may communicate with devices external to analysis computing system 120 by transmitting and/or receiving data, and may operate, in some respects, as both an input device and an output device. In some or all cases, communication unit 125 may communicate with other devices or computing systems over private network 101, public network 150, or over other networks.

One or more input devices 126 may represent any input devices of analysis computing system 120 not otherwise separately described herein, and one or more output devices 127 may represent any output devices of analysis computing systems 150 not otherwise separately described herein. Input devices 126 and/or output devices 127 may generate, receive, and/or process output from any type of device capable of outputting information to a human or machine. For example, one or more input devices 126 may generate, receive, and/or process input in the form of electrical, physical, audio, image, and/or visual input (e.g., peripheral device, keyboard, microphone, camera). Correspondingly, one or more output devices 127 may generate, receive, and/or process output in the form of electrical and/or physical output (e.g., peripheral device, actuator).

One or more storage devices 130 within analysis computing system 120 may store information for processing during operation of analysis computing system 120. Storage devices 130 may store program instructions and/or data associated with one or more of the modules described in accordance with one or more aspects of this disclosure. One or more processors 123 and one or more storage devices 130 may provide an operating environment or platform for such modules, which may be implemented as software, but may in some examples include any combination of hardware, firmware, and software. One or more processors 123 may execute instructions and one or more storage devices 130 may store instructions and/or data of one or more modules. The combination of processors 123 and storage devices 130 may retrieve, store, and/or execute the instructions and/or data of one or more applications, modules, or software. Processors 123 and/or storage devices 130 may also be operably coupled to one or more other software and/or hardware components, including, but not limited to, one or more of the components of analysis computing system 120 and/or one or more devices or systems illustrated or described as being connected to analysis computing system 120.

Path analysis module 131 may perform functions relating to evaluating session or proxy log information to extract URLs or other information relating to communications between storage devices 130 and service provider systems 190. Training module 133 may perform function relating to training, using machine learning techniques, one or more models 138. Remediation module 135 may perform functions relating to acting on analyses performed by collection computing system 170 pertaining to data maintenance practices of various service provider systems 190. Such actions may include reporting on results of such analyses or interacting with cloud access security broker system 108 or another system to configure, restrict, or otherwise regulate access to service provider systems 190 by user devices 103.

Data store 139 may represent any suitable data structure or storage medium for storing information related to operations performed by analysis computing system 120. The information stored in data store 139 may be searchable and/or categorized such that one or more modules within analysis computing system 120 (e.g., path analysis module 131, training module 133, remediation module 135) may provide an input requesting information from data store 139, and in response to the input, receive information stored within data store 139. Data store 139 may be primarily maintained by path analysis module 131.

In the example of FIG. 2, collection computing system 170 is also illustrated as including underlying physical hardware. Such hardware may include power source 171, one or more processors 173, one or more communication units 175, one or more input devices 176, one or more output devices 177, and one or more storage devices 180. These components may be implemented or may correspond to similar components described elsewhere herein (e.g., as with respect to analysis computing system 120). For example, power source 171 may provide power to one or more components of collection computing system 170. One or more processors 173 may implement functionality and/or execute instructions associated with collection computing system 170 or associated with one or more modules of collection computing system 170. One or more communication units 175 of collection computing system 170 may communicate with devices external to collection computing system 170 by transmitting and/or receiving data over a network or otherwise. One or more input devices 176 and output devices 177 may generate, receive, and/or process input and output, respectively. One or more storage devices 180 may store program instructions and/or data associated with one or more of the modules of storage devices 180 in accordance with one or more aspects of this disclosure.

Storage devices 180 may store program code for collection module 181, analysis module 183, reporting module 185, and data store 189. Storage device 180 may also store other information, including path data 186, one or more responses 182, and one or more production models 187.

Collection module 181 may perform functions relating to collecting (or attempting to collect) data (e.g., through requests 188) from service provider systems 190 using path data 186. Analysis module 183 may perform functions relating to analyzing any responses 182 received from service provider systems 190 as a result of attempts to collect data from service provider systems 190. Reporting module 185 may perform functions relating to communicating with other computing devices and systems (including, but not limited to analysis computing system 120) about analyses performed by analysis module 183. Such communications may include reports about the extent to which private, sensitive, confidential, or otherwise non-public information can be accessed at one or more service provider systems 190.

Data store 189 may represent any suitable data structure or storage medium for storing information related to operations performed by collection computing system 170. The information stored in data store 189 may be searchable and/or categorized such that one or more modules within collection computing system 170 may provide an input requesting information from data store 189, and in response to the input, receive information stored within data store 189. Data store 189 may be primarily maintained by collection module 181.

In FIG. 2, and in accordance with one or more aspects of the present disclosure, one or more of user devices 103 may interact with one or more of service provider systems 190. For instance, in an example that can be described in the context of FIG. 2, user device 103A outputs a signal over private network 101. Private network 101 routes the signal over public network 150. Service provider system 190A detects the signal and determines that the signal originated from user device 103A. User device 103A and service provider system 190A further communicate over private network 101 and public network 150. As a result of the communication, and in the process of service provider system 190A providing services to user device 103A, user device 103A may store data at service provider system 190A. In some cases, the data stored at service provider system 190A may be data that a user of user device 103A regards as sensitive (e.g., private, confidential, or otherwise non-public). Similarly, one or more other user devices 103 may communicate with service provider system 190A or other service provider systems 190 over private network 101 and public network 150. Such communications by user devices 103 may similarly involve data being transferred from user devices 103 to one or more of service provider systems 190. Again, and in general, data stored by user devices 103 at service provider systems 190 may be regarded by users of user devices 103 (or the organization associated with enterprise network 102) as including sensitive data.

Cloud access security broker system 108 may monitor interactions between user devices 103 and service provider systems 190. For instance, continuing with the example being described in connection with FIG. 2, cloud access security broker system 108 may monitor interactions and/or other communications between user devices 103 and service provider systems 190 by observing signals on connection 107. In such an example, cloud access security broker system 108 collects information about the interactions observed on connection 107 (see the arrow from connection 107 to cloud access security broker system 108 in FIG. 2, intended to represent monitoring of relevant network connections by cloud access security broker system 108).

Cloud access security broker system 108 may log information about the interactions. For instance, in FIG. 2, cloud access security broker system 108 outputs a signal over private network 101. Content system 104 detects a signal over private network 101 and determines that the signal corresponds to information about interactions observed by cloud access security broker system 108 between user devices 103 and service provider systems 190 on private network 101 (e.g., based on monitoring connection 107). Content system 104 stores information about the interactions in log data store 105. In some examples, the information about the interactions may include information that may be present in session logs or proxy logs maintained by cloud access security broker system 108 and/or content system 104. Such information may include URLs, URIs, server names, document names, URI and/or URL stems and objects, protocols, and other information. In some examples, such information may also include information about the time at which objects were accessed or stored at various service provider systems 190, information about authentication procedures employed by service provider systems 190, information derived from the content of the data accessed at or stored at service provider systems 190, or other information.

In the example being described, information about interactions between user devices 103 and service provider systems 190 is described as being transferred to content system 104 for storage at content system 104. In other examples, however, such interaction information may be stored elsewhere, including within cloud access security broker system 108, or at another system inside of enterprise network 102 or outside of enterprise network 102 (e.g., at a cloud-based system). Further, in some examples, cloud access security broker system 108 may serve as a direct intermediary between user devices 103 (or private network 101) and service provider systems 190. In such an example, cloud access security broker system 108 may apply security, content, or other policies of the organization associated with private network 101. Such policies may involve limiting access to one or more of service provider systems 190 or providing services designed to prevent data loss, control operations that may be permitted, detect security or malware threats, perform encryption and other services.

Analysis computing system 120 may analyze interactions between user devices 103 and service provider systems 190. For instance, again with reference to the example being described in connection with FIG. 2, path analysis module 131 of analysis computing system 120 causes communication unit 125 of analysis computing system 120 to output a signal over private network 101. Content system 104 detects a signal over private network 101 and determines that the signal corresponds to a request for information about interactions between user devices 103 and service provider systems 190. Content system 104 accesses information within log data store 105. Content system 104 outputs a signal over private network 101. Communication unit 125 of analysis computing system 120 detects a signal and outputs information about the signal to path analysis module 131. Path analysis module 131 determines that the signal includes information about interactions between storage devices 130 and service provider systems 190, including URIs or URLs associated with data accessed or stored by user devices 103 at service provider systems 190. Path analysis module 131 stores the information as path data 136. Path analysis module 131 analyzes path data 136, such as by parsing the URLs included within into stems and objects, as described in connection with FIG. 3. Path analysis module 131 identifies URLs and other path data that would be appropriate or effective to use in assessing whether sensitive data stored at one or more service provider systems 190 is being properly maintained by such service provider systems 190. In some examples, path analysis module 131 may select a subset of path data 136 for further analysis.

Analysis computing system 120 may communicate information about its analysis to collection computing system 170. For instance, still with reference to FIG. 2, path analysis module 131 causes communication unit 125 to output a signal over private network 101 and public network 150. Communication unit 175 of collection computing system 170 detects a signal and outputs information about the signal to collection module 181. Collection module 181 determines that the signal includes path information, URLs, and/or related information associated with data stored at one or more of service provider systems 190. In some examples, the path information received by collection computing system 170 may be the subset of path data 136 selected by analysis computing system 120. Collection module 181 stores the information received from analysis computing system 120 as path data 186.

Collection computing system 170 may initiate requests for data at one or more of service provider systems 190. For instance, again with reference to FIG. 2, analysis computing system 120 outputs a signal over private network 101 and public network 150 destined for collection computing system 170. Collection module 181 of collection computing system 170 receives information about the signal and interprets the signal as a command to initiate an analysis of the data management practices of one or more service provider systems 190. In response, collection module 181 evaluates path data 186 and identifies URLs or creates URLs that might be associated with publicly accessible data at one or more of service provider systems 190. Collection module 181 causes communication unit 175 to output a series of signals over public network 150. One or more of service provider systems 190 detect the signals over public network 150 and determine that the each of the signals correspond to a request 188 for a specific data object, web page, or other idem of data stored at a respective service provider system 190. Each of service provider systems 190 respond to such requests by outputting a corresponding response 182.

Specifically, and as illustrated in FIG. 2, service provider system 190A may receive request 188A, and in response, service provider system 190A may output response 182A to collection computing system 170 over public network 150. Similarly, service provider system 190B may receive request 188B, and in response, service provider system 190B may output response 182B to collection computing system 170 over public network 150. And in general, service provider system 190N may receive request 188N and respond by outputting response 182N to collection computing system 170 over public network 150.

Note that in the example being described, collection computing system 170 might not provide (and might not possess) authentication credentials associated with any of service provider systems 190. In most examples, collection computing system 170 seeks to simulate the network posture of a hacker or a malicious user that might not have any special access or authentication credentials. Accordingly, collection computing system 170 might not use any authentication data, but collection computing system 170 might also be located outside of enterprise network 102, since its presence inside of enterprise network 102 (e.g., having an address associated with private network 101) might also confer certain access not otherwise available to a hacker or anonymous public user. In general, therefore, collection computing system 170 may seek to access sensitive information that may be published by one or more service provider systems 190 without appropriate controls. As such, collection computing system 170 may issue requests for data with the access rights of an anonymous computing device that merely has access to public network 150.

Collection computing system 170 may collect responses to requests 188. For instance, still referring to FIG. 2, communication unit 175 of collection computing system 170 detects a series of signals over public network 150. Communication unit 175 outputs information about the signal to collection module 181. Collection module 181 determines that the signals correspond to responses 182 (i.e., response 182A through response 182N). Collection module 181 stores responses 182 within storage device 180. Collection module 181 may also store information derived from responses 182 within data store 189.

Collection computing system 170 may analyze responses 182. For instance, again with reference to FIG. 2, collection module 181 outputs information about the responses 182 to analysis module 183. Analysis module 183 evaluates the information and determines whether any of responses 182 contain any meaningful data. In some cases, one or more responses 182 may contain data, but such data might not be meaningful. For example, if a specific request, such as request 188A, is denied by service provider system 190A for lack of authentication (e.g., service provider system 190A requires authentication to access data specified by request 188A), then response 182A may contain data that simply reports that access to the underlying data object has been denied. However, in such an example, response 182A might not contain any meaningful data that is susceptible to analysis for the presence of sensitive data. Similarly, if response 182A to request 188A includes encrypted data, or data that is otherwise not susceptible to a sensitivity analysis (e.g., certain binary or non-text data), then response 182A might not be considered to include any meaningful data. For those requests 188 that do not result in a response 182 having meaningful data, analysis module 183 might conclude that no sensitive data is present, and might not undertake any further analysis for that request and response. In such examples, analysis module 183 may conclude that any sensitive data (e.g., private, confidential, or otherwise non-public data) that might be stored at the URL specified by such requests 188 is properly maintained and/or protected by the corresponding service provider system 190.

Collection computing system 170 may analyze responses 182 that do contain data. For instance, again referring to FIG. 2, analysis module 183 may determine that some of responses 182 include data that can be analyzed for the presence of sensitive information. In such examples, analysis module 183 may perform a further analysis of responses 182, which may involve analysis of any textual data included within a given response 182. In such an example, analysis module 183 analyzes the text included within a given response 182 for indicia or attributes of sensitive, private, confidential, or otherwise non-public information. Analysis module 183 may, for example, seek to identify text included within responses 182 having branding-related strings or similar information that suggests that sensitive information is present. For example, if businesses named "XYZ, Inc." or "ABC Corporation" are known to exist (e.g., if XYZ, Inc. operates enterprise network 102), analysis module 183 may evaluate whether a given response 182 includes a string of text having some form of the words "XYZ Confidential," "XYZ Restricted," "ABC Confidential," "ABC Restricted" or the like. If analysis module 183 identifies the presence of such a string within a response 182, then analysis module 183 may conclude that that response 182 includes sensitive information.

Similarly, certain sensitive information may have a known form, and a response 182 that includes data in such a form might represent sensitive data. For instance, a text string having the form "nnn-nn-nnnn," where each "n" character is a numeric digit, may represent a social security number, which is typically considered sensitive information. In another example, text strings which have some resemblance to known words, but that include other characters or seemingly random characters, might represent strings used for passwords (e.g., "Beagle1234"). If analysis module 183 determines that a specific response 182 includes a listing of such words, perhaps along with a corresponding list of email addresses (or usernames), analysis module 183 may conclude that that response 182 includes sensitive information.

Analysis module 183 may analyze all parts of any documents or other data objects included within responses 182, including not just the body of the document, but also headers, footers, watermarks, and metadata. Analysis module 183 might also evaluate responses 182 for the presence of data or strings that tend to indicate that the data does not include sensitive data. For example, if a response 182 includes a string such as "XYZ Public" or "ABC Public," that would tend to indicate that the response 182 does not contain sensitive data. In another example, analysis module 183 might also determine that a given response 182 includes data presented in a public setting (e.g., a slide deck for a known public presentation), or information that is known to already be public information (e.g., a restaurant menu, information matching news reporting, information otherwise publicly available elsewhere). To the extent that analysis module 183 identifies the presence of such text in a given response 182, analysis module 183 may conclude that that response 182 does not include sensitive information.

To perform the analysis on responses 182, analysis module 183 may apply a machine learning model (e.g., production model 187) that has been trained to distinguish between responses 182 that include sensitive information and responses 182 that do not include sensitive information. In some examples, production model 187 may be deployed on collection computing system 170, but the underlying data used to train production model 187 might not be stored on collection computing system 170.

Training production model 187 typically involves use of a training data that includes at least some sensitive, private, confidential, or otherwise non-public information. It may therefore be important to ensure that production model 187 is trained in a location (e.g., within enterprise network 102) where such training data can be reliably kept confidential. Once trained, however, applying the model to new data often does not require use of the sensitive training data, so deploying production model 187 at a location outside of enterprise network 102 might not place sensitive information at risk of disclosure. Accordingly, while a machine learning model could be trained by collection computing system 170, it may be preferable to train such a model on a computing system that may be better protected than collection computing system 170. In some examples, analysis computing system 120 is used to train one or more models 138 to distinguish between responses 182 having sensitive data and responses 182 that do not. Production model 187 may be selected from or based on such models 138.

In an example where analysis computing system 120 is used to train one or more machine learning models 138, analysis computing system 120 may collect training data for use in such training. For instance, and again with reference to FIG. 2, training module 133 of analysis computing system 120 causes communication unit 125 to output a series of signals over private network 101. Various systems within private network 101 (e.g., one or more content systems 104) detect one or more of the signals and determine that the signals correspond to requests for training data that can be used to train models 138. Communication unit 125 of analysis computing system 120 detects a series of responsive signals and outputs information about the signals to training module 133. Training module 133 determines that the signals include training data or data that can be used for training data. Training module 133 stores such information within storage device 130 or within data store 139 as training data 137.

Training data 137 may represent a set of documents and other data objects, some of which include sensitive information, and some of which do not. Training data 137 may include a corresponding desired output value associated with each data object that enables training module 133 to apply supervised learning techniques to train one or more models 138. Once trained, models 138 are capable of making a prediction about whether a data object includes sensitive information. Training data 137 (including data objects that have sensitive information and those that do not) may be derived from ordinary business records maintained by the systems on private network 101. Training data 137 may also include information monitored or observed by cloud access security broker system 108 being communicated to or from one or more of service provider systems 190 or other external systems accessible over public network 150. Training data 137 may also include third party information or manually curated information based on actual or simulated business records or documents. Such manually curated information may also include data derived from interactions observed by cloud access security broker system 108. Such manually curated information may also include information derived from actual responses 182 obtained during prior analyses of service provider systems 190, where such responses 182 have been manually evaluated (or reevaluated) for the presence of sensitive data. Such information may be used for training or retraining one or more models 138 (and production model 187) as part of an ongoing effort to improve the skill of such models 138.

Analysis computing system 120 may train one or more models 138. For instance, again referring to FIG. 2, training module 133 accesses training data 137 and applies one or more machine learning algorithms to develop models or parameters for models that can be used to predict whether a given set of information (e.g., one or more responses 182) include sensitive information (i.e., private, confidential, or otherwise non-public information). Training module 133 generates one or more models 138 and stores models 138 within storage device 130. In some examples, one or more of models 138 may generate a scoring rubric in order to determine the potential or likelihood that sensitive data (i.e., private, confidential, or otherwise non-public information) or data is included in a given set of data object or response 182.

Analysis computing system 120 may deploy one or more models 138 to collection computing system 170. For instance, referring to FIG. 2, training module 133 of analysis computing system 120 causes communication unit 125 to output a signal over private network 101 and public network 150. Communication unit 175 of collection computing system 170 detects a signal over public network 150 and outputs information about the signal to analysis module 183. Analysis module 183 determines that the signal includes one or more machine learning models that can be used to identify sensitive information included within responses 182. Analysis module 183 stores at least one of the machine learning models within storage device 180 as production model 187. Thereafter, when analysis module 183 assesses one or more responses 182 for sensitive information, analysis module 183 applies production model 187 to generate a prediction. The prediction is used by analysis module 183 to determine whether a specific response 182 includes sensitive information.

In some examples, when analysis module 183 applies production model 187, production model 187 may generate an output in the form of one of a finite number of categories, representing a likelihood that a given response 182 includes sensitive information. In one example, a production model 187 may indicate that information or data within a given response 182 falls within one of three categories: "high watermark," "medium watermark," or "low watermark."

Where production model 187 indicates a "high watermark," production model 187 has assessed that data included within a given response 182 likely includes sensitive information. Where a given response 182 is categorized as "high watermark," information about the underlying response 182 might be passed to a remediation team for further analysis (e.g., possibly involving actions to remove the sensitive data from the offending service provider system 190).

Production model 187 may categorize a response 182 in the "low watermark" category where the response 182 has been assessed as having no sensitive data (e.g., no private, confidential, or otherwise non-public information). In some examples, a path or URL corresponding to a response 182 categorized in the "low watermark" category might be marked as benign, thereby signaling to collection computing system 170 that it might not be necessary to reevaluate the URL for a period of time within a finite window (e.g., 30-60 days).

For responses 182 that production model 187 categorizes in the "medium watermark" category, information about such responses 182 may be communicated to a team of data analysts (e.g., within enterprise networks 102) for further analysis. In some examples, such an analysis may be used to generate additional training data 137. Such additional training data 137 may later be used by training module 133 to retrain and potentially improve the skill of one or more of models 138. One or more of such improved models 138 may eventually be deployed to collection computing system 170 for use as a new production model 187.

Collection computing system 170 may report information about the analysis of responses 182. For instance, referring again to FIG. 2, analysis module 183 of collection computing system 170 outputs information about the analysis performed by analysis module 183 (and production model 187) to reporting module 185. Reporting module 185 evaluates the information and determines whether and to what extent collection computing system 170 should communicate with other systems about the analyses performed. Reporting module 185 causes communication unit 175 to output a series of signals over public network 150 and private network 101. Communication unit 125 of analysis computing system 120 detects signals over private network 101 and outputs information about the signals to remediation module 135. Remediation module 135 determines that the signals correspond to reporting of results of the analysis performed by collection computing system 170.

Analysis computing system 120 may take action in response to the reporting by collection computing system 170. For instance, remediation module 135 of analysis computing system 120 uses the reporting information received from collection computing system 170 to identify instances in which one or more of service provider systems 190 seem to be making sensitive information publicly available on public network 150. Remediation module 135 takes action in response to identifying such instances, such as by modifying policies employed within enterprise network 102 of private network 101. In such an example, analysis computing system 120 may communicate with cloud access security broker system 108 over private network 101 and reconfigure and/or adjust whether or how cloud access security broker system 108 monitors, regulates, and/or controls access to one or more service provider systems 190. In some examples, such adjustments may involve restricting the types of data that can be exchanged between user devices 103 and service provider systems 190. Alternatively, or in addition, such adjustments may involve limiting access by one or more of user devices 103 to specific service provider systems 190 (e.g., those service provider systems 190 that are not sufficiently safeguarding private, sensitive, and/or confidential information). Alternatively, or in addition, such adjustments may also involve blocking all access to one or more of service provider systems 190.

In some examples, actions taken by analysis computing system 120 may include communicating with one or more devices operated by users, administrators, or SaaS providers. Such communications could provide alerts to administrators or security personnel overseeing enterprise network 102, thereby enabling action to be taken to secure information or remediate any information breaches. Such communications could also involve alerts or notifications being sent to users of user devices 103 within enterprise network 102. Such communications could also take the form of an attempt to notify each service provider system 190 that appears to be employing faulty or problematic data privacy practices. Such communications may have the effect of causing modifications to the faulty or problematic data privacy policies employed and/or implemented by various service provider systems 190. If such modifications are made and are successful, analysis computing system 120 may modify or lift any restrictions previously made in response to reporting by collection computing system 170.

Modules illustrated in FIG. 2 (e.g., path analysis module 131, training module 133, remediation module 135, collection module 181, analysis module 183, reporting module 185, and potentially others) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3:
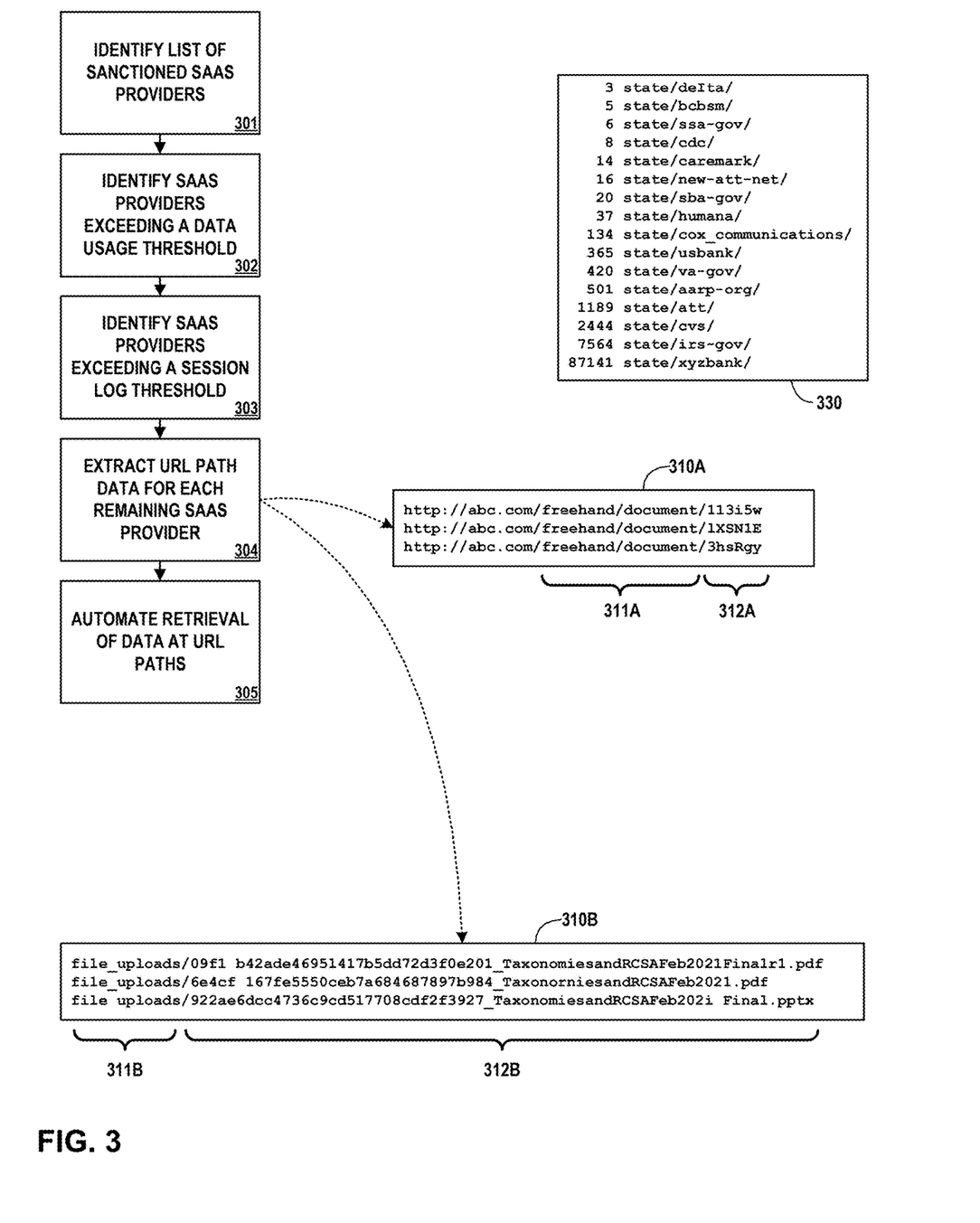
FIG. 3 is a conceptual diagram illustrating a process for automatically generating a manageable subset of path data that can be used to analyze data maintenance and/or management practices employed by various service provider systems, in accordance with one or more aspects of the present disclosure.

FIG. 3 is a conceptual diagram illustrating a process for automatically generating a manageable subset of path data that can be used to analyze data management practices employed by various service provider systems, in accordance with one or more aspects of the present disclosure. FIG. 3 includes a flow diagram (301-305) illustrating a process by which analysis computing system 120 analyzes interactions between user devices 103 and service provider systems 190, and performs actions based on such analysis. The interactions between user devices 103 and 190 can be characterized by certain URL or URI information, illustrated in FIG. 3 as URL data 310A and URL data 310B. Analysis computing system 120 may construct table 330 in order to filter or choose a subset of the URLs to use in evaluating one or more of service provider systems 190. Generally, table 330 can be used to effectively limit the volume of URLs to be processes or analyzed. Table 330 may also be used to deduce URL patterns relating to how one or more service provider systems 190 store data. As described herein, collection computing system 170 uses information derived from URL data (e.g., URL data 310A and URL data 310B) in order to interact with service provider systems 190 in an attempt to determine whether such service provider systems 190 are safeguarding data that has been entrusted to them.

In the process illustrated in FIG. 3, and in accordance with one or more aspects of the present disclosure, analysis computing system 120 may identify a list of sanctioned SaaS providers (301). For instance, in an example that can be described with reference to FIG. 1 and FIG. 3, analysis computing system 120 outputs a signal over private network 101 to cloud access security broker system 108. Cloud access security broker system 108 detects the signal and determines that it corresponds to a request for a list of approved SaaS providers (each of which may operate one of service provider systems 190). Cloud access security broker system 108 outputs a responsive signal over private network 101. Analysis computing system 120 detects the signal and determines that the signal includes a list of approved SaaS providers, and may include information (e.g., addresses, domain names) about corresponding service provider systems 190. The list of approved SaaS providers identifies those SaaS providers that are approved for use by users of enterprise network 102 (e.g., users of devices 103 on private network 101). There may be tens of thousands of SaaS providers, so there may be value in limiting the scope of any analysis performed by assessment computing system 110. While it may be appropriate to evaluate even those SaaS providers that are not approved or being used by users of enterprise network 102, it may be appropriate to limit any such analysis to just those SaaS providers approved by use by a given organization, such as an organization that administers enterprise network 102. Such filtering may have the effect of limiting the scope of an analysis undertaken by assessment computing system 110 to a manageable size.

Analysis computing system 120 may, from the list of sanctioned SaaS providers, identify SaaS providers having traffic that exceeds a data threshold (302). For instance, still referring to FIG. 1 and FIG. 3, analysis computing system 120 filters the list of SaaS providers to include those where the amount of traffic exchanged between each such SaaS site (i.e., a specific service provider system 190) and user devices 103 exceeds a threshold amount (e.g., approximately 300 k of traffic). For a large organization, this may further reduce the list of SaaS providers to evaluate from a number that is on the order of thousands of SaaS providers to, for example, a number that might approach or be on the order of one thousand or so.

Analysis computing system 120 may, from the remaining list of SaaS providers, identify SaaS providers having proxy log data that exceeds a certain threshold (303). For instance, still referring to FIG. 1 and FIG. 3, analysis computing system 120 filters the list of SaaS providers to limit the list to those where the amount of session log data associated with sessions between each such SaaS site (i.e., a specific service provider system 190) and user devices 103 during a specific time period exceeds a threshold amount (e.g., approximately 50 k of session data or so). For a large organization, this may further reduce the list from a size from a size on the order of 1000 to approximately a few hundred SaaS providers (i.e., a few hundred service provider systems 190).

Analysis computing system 120 may, for each remaining SaaS provider, extract URL path data from the sessions logs (304). For instance, still referring to FIG. 1 and FIG. 3, analysis computing system 120 extracts URL path information from the session data associated with communications between user devices 103 and each service provider system 190 corresponding to one of the SaaS providers that remains on the list. Analysis computing system 120 processes each URL to identify certain components of the URL, such as stems and objects. FIG. 3 illustrates two examples of such URL data: URL data 310A and URL data 310B. URL data 310A includes a list of URLs associated with a SaaS site that might be located at the abc.com domain. As shown in FIG. 3, a reference to stem 311A may refer to that portion of a specific URL that follows the domain, but precedes the name of a document that might be associated with a given URL. A reference to an object 312A may refer to that portion of the URL that generally corresponds to the filename or data file associated with the URL. URL data 310B is another example (omitting the protocol and domain names), showing those portions of three example URLs that correspond to stems 311B and objects 312B.

Analysis computing system 120 analyzes URL data 310 by counting the number of stems 311 (stems 311A and stems 311B). For example, it has been observed that common unique paths, or those having the same stem information, tend to have the highest concentration of document storage at SaaS systems. Therefore, counting unique path stems (e.g., the stem "freehand/document/" or the stem "file uploads/") may tend to yield directories or paths on a given service provider system 190 that are more likely to correspond to data being stored at that service provider system 190.

To isolate those URLs that are more likely to yield relevant data, analysis computing system 120 tabulates the occurrence counts of each stem, as illustrated in table 330 of FIG. 3. Table 330 is a list of stems for a given SaaS provider (i.e., one of service provider systems 190), along with an occurrence count for each of the stems. Table 330 indicates that stem "state/delta/" has only 3 occurrences, which may mean that log data associated with this SaaS provider included URLs matching this stem only 3 times. Stem "state/xyzbank/," on the other hand, had more than 87 thousand occurrences, which may mean that the same log data included URLs matching this stem more than 87 thousand times. Analysis computing system 120 may identify those stems with the highest occurrence counts (i.e., such as "state/xyzbank/and "state/irs-gov/") as being most appropriate for further analysis. Analysis computing system 120 generates a list of URLs that tends to include URLs having stems with high occurrence counts. Analysis computing system 120 generates path data that includes these URLs, and the resulting list is a subset of the full set of path data (e.g., see path data 136 shown in FIG. 2).

Analysis computing system 120 may automate retrieval of the data associated with the extracted URL path, and enable analysis of data successfully received at the corresponding URLs (305). For instance, again referring to FIG. 1 and FIG. 3, analysis computing system 120 outputs the subset of path data (described above) to collection computing system 170 and causes collection computing system 170 to attempt to access each URL in the list of URLs. Collection computing system 170 analyzes the responses and makes an assessment about whether the response includes data and/or whether it includes data that might be characterized as private, sensitive, confidential, and/or otherwise non-public information. In some examples, collection computing system 170 may attempt to access data at all of the URLs corresponding to the high occurrence count stem (e.g., all 87,141 of the URLs using stem "state/xyzbank/"). In other examples, however, collection computing system 170 might attempt to access only a high or large sample of those URLs, which may be enough to make assessments about whether the service provider system 190 associated with table 330 is properly maintaining the sensitivity of data. For example, if collection computing system 170 accesses 30,000 URLs using the stem "state/xyzbank/" and is unable to find any sensitive data, collection computing system 170 may conclude that the corresponding service provider system 190 is likely properly maintaining the confidentiality of data stored at all or the vast majority of the locations that use that stem.

After performing collection and analysis operations, collection computing system 170 may report its findings to analysis computing system 120. Analysis computing system 120 may act on the reported findings received from collection computing system 170.

In some examples, and as described herein, collection computing system 170 may collect data from service provider systems 190 using URLs that correspond to or that are the same as those identified in proxy data, session data, or other log data (generally "interaction data") obtained from cloud access security broker system 108 and/or content system 104. In other words, collection computing system 170 may simply use the same URLs that were previously used by one or more of user devices 103 within enterprise network 102 to store or access data at service provider systems 190. However, in some cases it may be possible to leverage the interaction data stored by enterprise network 102 to gain further insights about how one or more of service provider systems 190 store data. For example, it may be possible to identify other URLs that can be used in data access attempts performed by collection computing system 170, where such other URLs might not directly correspond to those used by user devices 103 during prior sessions with service provider systems 190.

For example, note that the URLs illustrated within URL data 310A of FIG. 3 seem to have some regularity, such that the illustrated URLs in URL data 310A not only have the same stem 311A, but also, each of the objects 312A are the same length (i.e., 6 characters in length). Analysis computing system 120 may identify such patterns or regularity in objects 312 included within various instances of URL data 310, and determine that the service provider system 190 associated with such URL data 310 stores data using a predictable pattern. In the example of URL data 310A, data appears to be stored using stem 311A and objects 312A, where those objects 312A are simply randomly generated 6-character strings. Analysis computing system 120 may recognize this pattern and use the pattern to generate a comprehensive list of all possible URLs stored at locations that use this common stem 311A of URL data 310A. To generate such a list, analysis computing system 120 generates a list of all possible 6-character strings and uses such strings as objects to pair with stem 311A. The resulting list of URLs might be quite large, but it would be finite. And for an automated system, as described herein, a significant portion of the URLs on such a list could be evaluated within a reasonable time frame.

In such an example, analysis computing system 120 generates a list of URLs, communicates the list to collection computing system 170, and causes collection computing system 170 to perform systematic and automated collection and analysis operations with respect to a specific service provider system 190 that uses an identifiable pattern to store data. Such collection and analysis operations may yield additional information and insights about the data storage practices by each of the corresponding SaaS provider, beyond what might be gained by simply accessing specific identifiable URLs manifested in interaction data derived from communication sessions between user devices 103 of enterprise network 102 and service provider systems 190.

Figure 4:
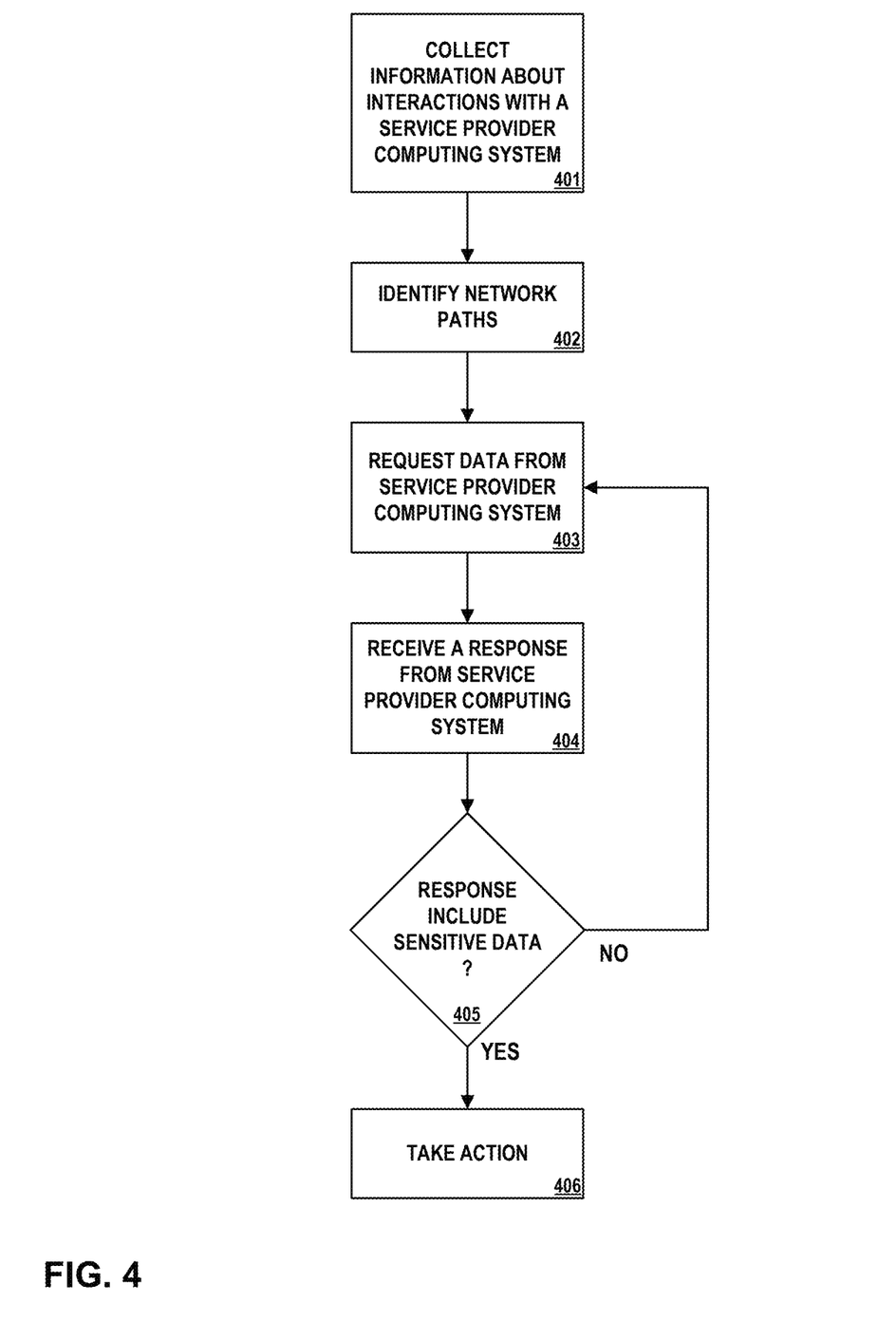
FIG. 4 is a flow diagram illustrating operations performed by an example assessment computing system in accordance with one or more aspects of the present disclosure.

FIG. 4 is a flow diagram illustrating operations performed by an example assessment computing system in accordance with one or more aspects of the present disclosure. FIG. 4 is described below within the context of assessment computing system 110 of FIG. 1. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, assessment computing system 110 may collect information about interactions with one or more service provider systems 190 (401 of FIG. 4). For example, with reference to FIG. 1, analysis computing system 120 of assessment computing system 110 outputs a signal over private network 101. Content system 104 detects a signal over private network 101 and determines that the signal corresponds to a request for information about communications between user devices 103 and service provider systems 190. Content system 104 outputs a signal over private network 101. Analysis computing system 120 detects a signal over private network 101 and determines that the signal includes information about communications that have previously taken place between user devices 103 and service provider systems 190.

Assessment computing system 110 may identify network paths (402). For example, again referring to FIG. 1, analysis computing system 120 analyzes the information received from content system 104 and identifies URLs, URIs, and/or network path information associated with content stored to or accessed at service provider systems 190 by one or more user devices 103. Analysis computing system 120 may extract stem and object information from each of the URLs and perform an analysis to identify those URLs having commonly-occurring stems (stems that are present in multiple URL strings), such as in the manner described in connection with FIG. 3. Analysis computing system 120 may also select a subset of the URLs using the URLs having more commonly-occurring stems (or the most commonly-occurring stems). Analysis computing system 120 may select such a subset in order to limit the amount of processing and network traffic that might be associated with evaluating the path information.

Assessment computing system 110 may request data from one or more service provider systems 190 (403). For example, in FIG. 1, analysis computing system 120 of assessment computing system 110 outputs a signal over private network 101 and public network 150. Collection computing system 170 of assessment computing system 110 receives a signal and determines that the signal includes a list of URLs that can be used to evaluate data maintenance practices of one or more service provider systems 190. Collection computing system 170 uses the URLs to request data from at least one of service provider systems 190. In one example, collection computing system 170 outputs request 188A over public network 150, seeking to access data at one of the URLs in the list of URLs received from analysis computing system 120. Since collection computing system 170 is not on private network 101, collection computing system 170 is making the request over public network 150. In the example being described, collection computing system 170 does not provide authentication credentials any of service provider systems 190, and is therefore requesting data (through request 188A) with the access rights of an anonymous computing device that merely has access to public network 150.

Assessment computing system 110 may receive a response to the request from a service provider system 190 (404). For example, again with reference to FIG. 1 and in the example being described, service provider system 190A detects a signal over public network 150. Service provider system 190A determines that the signal corresponds to request 188A. Service provider system 190A outputs a responsive signal over public network 150. Collection computing system 170 of assessment computing system 110 detects a signal over public network 150 and determines that the signal corresponds to response 182A from service provider system 190A.

Assessment computing system 110 may determine whether response 182A includes sensitive data (405). For example, collection computing system 170 analyzes response 182A to determine whether it includes any data or any meaningful data. If response 182A does not include any data, or is simply a denial of the request for data, collection computing system 170 concludes that no sensitive data is available at the requested URL. Collection computing system 170 may also conclude that for the data at the requested URL, service provider system 190A appears to be properly protecting the privacy and/or confidentiality of any sensitive data that might be stored at that URL (NO path from 405). Assessment computing system 110 may then continue processing other URLs by issuing new requests to service provider systems 190.

If collection computing system 170 determines that response 182A does include data, collection computing system 170 analyzes the data to determine whether it includes sensitive information. In some examples, collection computing system 170 may apply a machine learning model to make such an assessment. If the model determines that no sensitive data is included within response 182A, collection computing system 170 concludes that for the specified URL, no sensitive data is being improperly published by service provider system 190A. Collection computing system 170 of assessment computing system 110 may continue evaluating other URLs in the list (NO path from 405). In some examples, if response 182A is benign (contains no sensitive data), assessment operations performed by collection computing system 170 may be adjusted to avoid reassessing the same URL for some period of time in the future (e.g., within the next 60 days).

If collection computing system 170 of assessment computing system 110 determines that response 182A does include sensitive data, assessment computing system 110 may take action (406 and YES path from 405). For example, collection computing system 170 may report, to analysis computing system 120, information about URLs and/or service provider systems 190 that are making sensitive data publicly available on public network 150. Analysis computing system 120 may evaluate the reporting and take action, such as by sending information to appropriate personnel (e.g., administrators of enterprise network 102), by limiting access to one or more service provider systems 190, or by taking other actions. In some examples, limiting access to one or more service provider systems 190 may involve analysis computing system 120 configuring cloud access security broker system 108 to restrict access by user devices 103 to one or more of service provider systems 190. In some examples, whether or not sensitive data is detected, the machine learning model may be retrained using response 182A as an additional training example.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are each hereby incorporated by reference in their entireties. To the extent that any such disclosure material that is incorporated by reference conflicts with the instant disclosure, the instant disclosure shall control.

For ease of illustration, only a limited number of devices (e.g., analysis computing system 120, collection computing system 170, service provider systems 190, cloud access security broker system 108, content system 104, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
    collecting, by a computing system, information about interactions with a service provider computing system, wherein the interactions with the service provider computing system are based on activity of user devices on a private network that are authenticated to access data at the service provider computing system;
    identifying, by the computing system and based on the information about the interactions, a plurality of network paths, each associated with a data object accessed by at least one of the user devices at the service provider computing system;
    requesting, by the computing system using a device not on the private network and not authenticated to access data at the service provider computing system and based on the plurality of network paths, data from the service provider computing system;
    responsive to requesting the data, receiving, by the computing system, a response;
    determining, by the computing system and based on the response, whether the response includes sensitive information; and
    taking action by the computing system based on whether the response includes sensitive data.

2. The method of claim 1, wherein collecting the information about the interactions includes:
    accessing activity log information that is maintained by the private network and is associated with interactions by the user devices with the service provider computing system.

3. The method of claim 1, wherein identifying the plurality of network paths includes:
    identifying a plurality of stems, each included within a network path of the plurality of network paths; and
    determining an occurrence count associated with each of the plurality of stems.

4. The method of claim 3, wherein identifying the plurality of network paths further includes:
    identifying a subset of the plurality of stems based on the occurrence count associated with each of the plurality of stems; and
    generating the plurality of network paths based on the subset of the plurality of stems.

5. The method of claim 1, further comprising:
    training a machine learning model to identify data that includes sensitive information.

6. The method of claim 5, wherein determining whether the response includes sensitive data includes:
    applying the machine learning model to the response.

7. The method of claim 1, wherein the service provider computing system is a first service provider computing system, wherein the plurality of network paths is a first plurality of network paths, and wherein the response is a first response, the method further comprising:
    collecting, by the computing system, information about interactions with a second service provider computing system, wherein the interactions with the second service provider computing system are based on the activity of the user devices on the private network;

identifying, by the computing system and based on the information about the interactions with the second service provider computing system, a second plurality of network paths, each associated with a data object accessed by at least one of the user devices at the second service provider computing system;

requesting, from the second service provider computing system and based on the second plurality of network paths, data from the second service provider computing system;

responsive to requesting the data from the second service provider computing system, receiving, by the computing system, a second response; and determining, by the computing system and based on the second response, whether the second response includes sensitive information.

8. The method of claim 1, wherein the computing system comprises:
an analysis computing system that is on the private network; and
a collection computing system that is not on the private network.

9. The method of claim 8, wherein collecting the information about the interactions includes:
collecting, by the analysis computing system, the information about the interactions.

10. The method of claim 8, wherein requesting the data from the service provider computing system includes:
requesting, by the collection computing system, the data from the service provider computing system.

11. The method of claim 8, wherein taking action includes:
configuring a cloud access security broker, by the analysis computing system, to restrict access by the user devices to the service provider computing system.

12. A system comprising an analysis computing system and a collection computing system, wherein the analysis computing system is on a private network, and the collection computing system is not on the private network, and wherein the analysis computing system comprises processing circuitry and a storage device, and wherein the processing circuitry has access to the storage device and is configured to:
collect information about interactions with a service provider computing system, wherein the interactions with the service provider computing system are based on activity of user devices on the private network that are authenticated to access data at the service provider computing system;
identify, based on the information about the interactions, a plurality of network paths, each associated with a data object accessed at the service provider computing system;
enable the collection computing system to:
request, using a device not on the private network and not authenticated to access data at the service provider computing system and based on the plurality of network paths, data from the service provider computing system,
receive a response, and
determine, based on the response, whether the response includes sensitive information; and
take action based on whether the response includes sensitive data.

13. The system of claim 12, wherein to collect the information about the interactions, the analysis computing system is further configured to:
access activity log information that is maintained by the private network.

14. The system of claim 12, wherein to identify the plurality of network paths, the analysis computing system is further configured to:
identify a plurality of stems, each included within a network path of the plurality of network paths; and
determine an occurrence count associated with each of the plurality of stems.

15. The system of claim 14, wherein to identify the plurality of network paths, the analysis computing system is further configured to:
identify a subset of the plurality of stems on the occurrence count associated with each of the plurality of stems;
generate the plurality of network paths based on the subset of the plurality of stems.

16. The system of claim 12, wherein the analysis computing system is further configured to:
train a machine learning model to identify data that includes sensitive information.

17. The system of claim 16, wherein to determine whether the response includes sensitive data, the collection computing system is configured to:
apply the machine learning model to the response.

18. The system of claim 12, wherein the service provider computing system is a first service provider computing system, wherein the plurality of network paths is a first plurality of network paths, wherein the response is a first response, and wherein the analysis computing system is further configured to:
collect information about interactions with a second service provider computing system, wherein the interactions with the second service provider computing system are based on the activity of the user devices on the private network; and
identify, based on the information about the interactions with the second service provider computing system, a second plurality of network paths, each associated with a data object accessed at the second service provider computing system.

19. The system of claim 18, wherein the analysis computing system is further configured to enable the collection computing system to:
request, from the second service provider computing system and based on the second plurality of network paths, data from the second service provider computing system;
receive a second response;
determine, based on the second response, whether the second response includes sensitive information.

20. A non-transitory computer-readable storage medium comprising instructions that, when executed, configure processing circuitry of a computing system to:
collect information about interactions with a service provider computing system, wherein the interactions with the service provider computing system are based on activity of user devices on a private network that are authenticated to access data at the service provider computing system;
identify, based on the information about the interactions, a plurality of network paths, each associated with a data object accessed at the service provider computing system;

enable a collection computing system to request data from the service provider computing system using a device not on the private network and not authenticated to access data at the service provider computing system, receive a response, and determine whether the response includes sensitive information; and take action based on whether the response includes sensitive data.

\* \* \* \* \*